3,004,831
PREPARATION OF HYDROGEN PEROXIDE
Fulton H. Hungerford, Titusville, Fla., and Richard J. Samelson, Corpus Christi, Tex., assignors, by mesne assignments, to Pittsburgh Plate Glass Company
No Drawing. Filed Aug. 7, 1958, Ser. No. 753,618
14 Claims. (Cl. 23—207)

This invention relates to an improvement in the method of making hydrogen peroxide. It is known that hydrogen peroxide can be made by successive hydrogenation and oxidation of certain organic compounds, followed by extraction of the evolved hydrogen peroxide from the organic compound with water. In a typical process of such a character, certain quinones, such as 2-ethyl anthraquinone, have been used. Such processes have been described in the following United States Letters Patent: 2,158,525, 2,215,883, 2,657,980, 2,668,753.

Hydrogenation in the processes mentioned above normally has been conducted in the presence of a metallic hydrogenation catalyst, such as palladium, Raney nickel or the like. The metal catalyst usually is supported on a carrier, such as active alumina, active carbon, silica or the like, and is kept suspended in the quinone or solution thereof by agitation or is maintained in a bed through which the solution is allowed to flow. As a consequence of the hydrogenation, the quinone is converted to the corresponding hydroquinone.

In the oxidation stage, the hydroquinone produced by the hydrogenation is separated from the catalyst and then is oxidized with air or oxygen to regenerate the quinone and to produce hydrogen peroxide. This process commonly is performed in the absence of catalyst, simply by bubbling air or oxygen through a solution of the hydroquinone.

Following the oxidation step, the solution is extracted with water. This step is hereinafter called the "extraction step." The water phase contains hydrogen peroxide which may be recovered by distillation or used as such. The organic phase containing the quinone and solvent therefor is reused in subsequent cycles for production of further hydrogen peroxide.

In the practice of this process, the catalyst gradually loses its activity and must be replaced or further catalyst added. Where the life of the catalyst is short, the catalyst cost can become excessively high and constitute an unreasonable portion of the cost of producing hydrogen peroxide.

Normally, catalyst of reduced activity or spent catalyst is withdrawn from the system and subjected to special treatment for reactivation. Prior to this invention, no method of reactivating the catalyst in situ appears to have been provided.

According to this invention, a simple method of reactivating the catalyst has been provided. This method is especially advantageous since it can be performed without removal of the catalyst from the solution or suspension of anthraquinone and/or anthraquinol. Thus, the catalyst activity may be improved in situ in the hydrogenation zone or a portion of the catalyst suspension in the quinone may be withdrawn from the hydrogenator and reactivated.

It has been found that this may be accomplished by periodically decreasing the pressure of elemental hydrogen in contact with the catalyst and the quinone and/or quinol solution undergoing hydrogenation, and thereafter passing a gas which is inert to the quinone and quinol into the suspension containg the catalyst while the hydrogen pressure has been so reduced. After the catalyst has been reactivated or at least after its activity has been substantially increased, the hydrogen pressure in the hydrogenator is increased, usually to its initial level, and hydrogenation is continued.

In accordance with one simple embodiment, hydrogen is passed through a solution of the aklyl anthraquinone having a catalyst suspended therein or in contact therewith in the conventional way. After the process has been conducted long enough so that the activity of the catalyst begins to diminish, introduction of hydrogen into the solution is discontinued and thereafter an inert gas, such as nitrogen, is passed through the catalyst-quinol suspension for a suitable period of time. This inert gas contains little or no hydrogen in such an embodiment although a certain amount of residual hydrogen normally is present in the system for a substantial period after hydrogen introduction is discontinued. In any event, the hydrogen pressure in the hydrogenator is substantailly less (usually at least 0.1-0.3 atmophere less) than that established during regular hydrogenation.

Alternatively, the process may be conducted reactivating the catalyst using an inert gas which contains some hydrogen but in which the hydrogen partial pressure is below (usually at least 0.1 to 0.3 atmosphere below) that at which the hydrogenation normally is conducted. Thus, in the practice of this embodiment, hydrogen which may or may not be mixed with an inert gas is introduced into the quinone solution in contact with the catalyst in the regular way. Thereafter, the hydrogen pressure is reduced substantially and a gaseous mixture containing hydrogen and an inert gas, in which the hydrogen pressure is at least about 0.1 to 0.3 atmosphere lower and the inert gas partial pressure is at least 0.1 to 0.3 atmosphere higher than the inert gas partial of the hydrogen-containing gas normally used, is passed through the solution or slurry while in contact with the catalyst.

An effective method of conducting the hydrogenation at a relatively rapid rate is to introduce the hydrogen into the quinone solution more rapidly than it is absorbed and recycling the unabsorbed hydrogen together with make-up. Thus, gaseous hydrogen may be introduced into the lower portion of a pool of quinone solution containing catalyst and the unabsorbed hydrogen allowed to escape from the surface of the liquid. This unabsorbed gas is then mixed with enough fresh hydrogen to make up for that absorbed, and the resulting mixture is recycled to the lower portion of the pool.

In the practice of this recycle operation, catalyst is reactivated periodically by discontinuing the addition of fresh hydrogen and instead introducing inert gas into the recycling hydrogenating gas. As cycling proceeds, hydrogen continues to be absorbed, the hydrogen partial pressure in the gas entering the pool falls, and the inert gas partial pressure rises. This continues until the catalyst activity has been largely restored or at least substantially increased. Thereafter, introduction of inert gas is discontinued or its rate of introduction is decreased and hydrogen is introduced into the recycling gas stream, thus raising the partial pressure of the hydrogen in the gas entering the pool to substantially its initial level.

The treatment of the catalyst suspension with inert gas, as herein contemplated, may be effected at any convenient temperature below that at which substantial decomposition of the solution or quinol takes place. Temperatures of 50 to 150° F. are suitable. However, higher temperatures may be used.

The time during which the inert gas is introduced as herein described normally ranges from 20 minutes to 4 hours. Longer periods of time may be used if desired.

In accordance with a further embodiment of the invention, a slurry of catalyst in the solution or suspension anthraquinone may be withdrawn continuously or periodically from the hydrogenator and the catalyst reactivated by passage of inert gas through the slurry. This frequently is advantageous since it affords a convenient method for reactivating the catalyst without shutting down the hydrogenator. Thus, hydrogenation of anthraquinone may be continued without interruption in such a case and the withdrawn slurry, after treatment with nitrogen or like inert gas, may be returned to the hydrogenator.

Any convenient gas which is inert with respect to the solvent, the quinone, and the quinol, may be used for the purpose herein contemplated, including nitrogen, argon, carbon dioxide, helium, methane, ammonia or the like.

The following are typical examples:

*Example I*

The system used for production of hydrogen peroxide involved a hydrogenator vessel having a capacity of 150 gallons, an oxidizing vessel having a capacity of 150 gallons, and an extraction column, all connected together. The solution used was a mixture of 2-ethyl anthraquinone and 2-ethyl tetrahydroquinone dissolved in alkyl benzenes having a boiling range of 365 to 415° F. and predominantly consisting of alkyl benzenes containing 10 to 11 carbon atoms. This solution contained about 30 grams per liter of 2-ethyl anthraquinone and 30 grams per liter of 2-ethyl tetrahydroquinone.

The system was charged with this solution, about 100 gallons being in the hydrogenator and 150 gallons in the oxidizer. Circulation of solution was commenced at the rate of 5 gallons per minute, solution being withdrawn from the hydrogenator through a filter to remove catalyst, and the filtered solution was delivered to the oxidizer. The solution from the oxidizer was delivered to the bottom of a continuous extractor, water being supplied to the top of the column, and the extracted solution was transferred from the top of the column to the hydrogenator.

After circulation was commenced, the hydrogenator was purged with nitrogen and 3 pounds of metallic palladium catalyst on aluminum silicate carrier was suspended in the solution in the hydrogenator and hydrogen gas was introduced into the lower portion of the hydrogenator at a rate such as to hold the catalyst in suspension. Unabsorbed hydrogen rose through the pool and was collected outside the hydrogenator, a portion purged, and the remainder recycled to the bottom of the hydrogenator, additional hydrogen being added continuously. The amount of such hydrogen recycled was 550 cubic feet per hour. The amount of additional hydrogen introduced was 200 cubic feet per hour and the amount of purge 50 cubic feet per hour, all measured at 760 millimeters pressure and 70° F.

The process was continued over a period of many days, the amount of catalyst in the hydrogenator being initially sufficient to establish the quinol content of the solution, leaving the hydrogenator equivalent to 6.97 grams of $H_2O_2$ per liter. As time went by, further catalyst was added to hold the quinol content above about 5 grams per liter $H_2O_2$. However, this quinol content gradually decreased to an equivalent of 4.06 grams of $H_2O_2$ per liter.

Thereupon, the introduction of hydrogen into the recycle system was stopped, circulation of solution being continued. Nitrogen was introduced into the solution in the hydrogenator at the bottom of the pool of this solution at a rate of 100 cubic feet per minute measured at 70° F. and one atmosphere absolute pressure, the gas escaping from the top of the hydrogenator being recycled and a purge of 50 cubic feet per hour being taken as before. Nitrogen introduction was continued at this rate for 4 hours while the solution was at a temperature of 115° F.

During this period, hydrogen was purged from the system and, within an hour, the amount of hydrogen was below 20 percent by volume of the gas flowing through the hydrogenator.

After 4 hours, nitrogen introduction was discontinued and hydrogen introduced at the rate specified above. The degree of hydrogenation which then took place was equivalent to 5.42 grams of $H_2O_2$ per liter of solution, no catalyst being added or removed.

*Example II*

The process of Example I was repeated using the solution and rate of circulation substantially as therein stated and introducing hydrogen into the solution disposed in the hydrogenator at the rates and in the manner described in Example I. The test was run for a period of two weeks. About once a day, introduction of make-up hydrogen into the recycling hydrogenating gas was stopped for a period of 2 hours and gaseous carbon dioxide was fed into the recycling gas stream at the rate of 100 cubic feet per hour, measured at 760 millimeters pressure and 70° F., during the full 2-hour period. During the remaining part of the time, hydrogen was fed into the recycling gas at the rate of 200 cubic feet per hour, the rate of flow of hydrogen in the recycle stream being 550 cubic feet per hour, all measured under the conditions stated above. A purge of 50 cubic feet per hour was taken throughout the test, as in Example I.

After each treatment with carbon dioxide, the activity of the catalyst increased. During the test, the productivity of the catalyst increased from 140 to 191 pounds of $H_2O_2$ per pound of catalyst. Any carbon dioxide absorbed in the solution was stripped out in the oxidizer.

The process herein contemplated may be conducted in connection with any process of alternate catalytic hydrogenation and oxidation of organic compounds, such as quinones or azobenzenes. The process is best conducted using quinones, particularly polynuclear quinones, as the compound to be hydrogenated. Such quinones include 2-alkyl anthraquinones, such as 2-ethyl anthraquinone, 2-tertiary butyl anthraquinone, 2-n propyl anthraquinones, 2-tertiary butyl tetrahydroanthraquinone, 2-ethyl tetrahydroquinone, and the like. Thus, this process may be applied to use in connection with processes described in the following United States Letters Patent: 2,215,883; 2,369,912; 2,455,238; 2,495,229; 2,537,516; 2,657,980; 2,668,753; 2,673,140; 2,689,169; 2,692,240; 2,739,042; 2,768,065; 2,768,066.

Thus, other catalysts may be used, including palladium metal on alumina, palladium metal on bone char, Raney nickel, and the like. Moreover, other solvents may be used, including naphthalenes and the like. Usually, a mixture of solvents is used. Such mixtures normally comprise one or more of the following hydrocarbons:

| | |
|---|---|
| benzene | tetramethyl benzene |
| xylene | methyl naphthalenes |
| toluene | diphenyl |
| di- or triethyl benzene | diphenyl oxide | with an alcohol ketone or ester as follows:

primary or secondary alcohols, such as cyclohexanol, diisobutyl carbinol, nonyl alcohols, hexanol, etc.,
esters, such as dibutyl phthalate, dibutyl sebacate, etc.,
ketones, such as diisobutyl ketone and hololgues thereof.

In large scale operation, it generally is advantageous to convert less than 50 percent of the quinone to quinol (i.e., less than 50 percent of the maximum amount of hydrogen which can be absorbed for production of quinol) in order to prevent or minimize production of inactive solids by further hydrogenation. This can be done by control of the amount of catalyst in the hydrogenator.

As hydrogenation proceeds, catalyst activity declines and, to compensate for this, further catalyst is added, usually in amounts sufficient to maintain the quinol content of the hydrogenated solution leaving the hydrogenating system at least equivalent to about 3 grams of $H_2O_2$ per liter. When catalyst is reactivated according to the method herein contemplated, the degree of conversion of quinone to quinol increases when hydrogenation is started up again. This can cause an undue degree of conversion over the 50 percent level desired. In such a case, a portion of the catalyst is removed from the system and reserved for future use.

Although the present invention has been described with particular reference to the specific details of certain embodiments, it is not intended that such details shall be regarded as limitations upon the scope of the present invention except insofar as included in the accompanying claims.

This application is copending with application Serial No. 641,835, filed Feb. 25, 1957, now abandoned, containing subject matter common with this application.

What is claimed is:

1. In the method of producing hydrogen peroxide by alternate catalytic hydrogenation of a member of the group consisting of quinones and azobenzenes in liquid phase and in the presence of metallic hydrogenation catalyst, oxidation of the resulting hydrogenated product to liberate hydrogen peroxide and recovering the hydrogen peroxide, the improvement which comprises periodically reducing the pressure of hydrogen in contact with said liquid phase after the catalyst activity has diminished and passing an inert gas through said liquid while the catalyst is in contact therewith and while the hydrogen pressure is reduced, continuing said passage of inert gas until the activity of the catalyst has increased, and thereafter increasing the hydrogen pressure in contact with said liquid phase.

2. In the method of producing hydrogen peroxide by alternate catalytic hydrogenation of a polynuclear quinone in liquid phase and in the presence of metallic hydrogenation catalyst, oxidation of the resulting hydrogenated product to liberate hydrogen peroxide and recovering the hydrogen peroxide, the improvement which comprises periodically reducing the pressure of hydrogen in contact with said liquid phase after the catalyst activity has diminished and passing an inert gas through said liquid while the catalyst is in contact therewith and while the hydrogen pressure is reduced, continuing said passage of inert gas until the activity of the catalyst has increased, and thereafter increasing the hydrogen pressure in contact with said liquid phase.

3. In the method of producing hydrogen peroxide by alternate catalytic hydrogenation of a polynuclear quinone in liquid phase and in the presence of palladium metal catalyst, oxidation of the resulting hydrogenated product to liberate hydrogen peroxide and recovering the hydrogen peroxide, the improvement which comprises periodically reducing the pressure of hydrogen in contact with said liquid phase after the catalyst activity has diminished and passing an inert gas through said liquid while the catalyst is in contact therewith and while the hydrogen pressure is reduced, continuing said passage of inert gas until the activity of the catalyst has increased, and thereafter increasing the hydrogen pressure in contact with said liquid phase.

4. In the method of producing hydrogen peroxide by alternate catalytic hydrogenation of a polynuclear quinone in liquid phase and in the presence of metallic hydrogenation catalyst of the group consisting of metallic palladium and Raney nickel, oxidation of the resulting hydrogenated product to liberate hydrogen peroxide and recovering the hydrogen peroxide, the improvement which comprises periodically reducing the pressure of hydrogen in contact with said liquid phase after the catalyst activity has diminished and passing an inert gas through said liquid while the catalyst is in contact therewith and while the hydrogen pressure is reduced, continuing said passage of inert gas until the activity of the catalyst has increased, and thereafter increasing the hydrogen pressure in contact with said liquid phase.

5. The process of claim 1 wherein introduction of hydrogen into the hydrogenation system is discontinued while the inert gas is passed in contact with the liquid phase.

6. The process of claim 2 wherein introduction of hydrogen into the hydrogenation system is discontinued while the inert gas is passed in contact with the liquid phase.

7. In the method of producing hydrogen peroxide by alternate hydrogenation of a member of the group consisting of quinones and azobenzenes in liquid phase and in the presence of a metallic hydrogenation catalyst, oxidation of the resulting hydrogenated product to liberate hydrogen peroxide and recovering the hydrogen peroxide, the improvement which comprises conducting the hydrogenation by introducing hydrogen into the liquid phase at a rate faster than it is absorbed, collecting and recycling unabsorbed hydrogen, feeding additional hydrogen into the liquid phase to make up the absorbed hydrogen and periodically discontinuing the feeding of said additional hydrogen after the catalyst activity has diminished and introducing inert gas into said liquid phase while continuing said recycle, continuing introduction of said inert gas until the activity of the catalyst has been increased, and thereafter feeding said additional hydrogen into said liquid phase again.

8. The process of claim 7 wherein the catalyst is palladium metal and the quinone is a polynuclear quinone.

9. The process of claim 2 wherein the quinone is a 2-alkyl anthraquinone.

10. In the method of producing hydrogen peroxide by alternate hydrogenation of a polynuclear quinone in liquid phase and in the presence of a palladium metal catalyst, oxidation of the resulting hydrogenated product to liberate hydrogen peroxide and recovering the hydrogen peroxide, the improvement which comprises periodically discontinuing introduction of hydrogen into said liquid phase after the catalyst activity has diminished and passing an inert gas through the liquid while the catalyst is in contact therewith and while the introduction of hydrogen is discontinued.

11. In the method of producing hydrogen peroxide by alternate hydrogenation of a polynuclear quinone in liquid phase and in the presence of a palladium metal catalyst, oxidation of the resulting hydrogenated product to liberate hydrogen peroxide and recovering the hydrogen peroxide, the improvement which comprises periodically discontinuing introduction of hydrogen into said liquid phase after the catalyst activity has diminished and passing an inert gas through the liquid while the catalyst is in contact therewith and while the introduction of hydrogen is discontinued, continuing said passage of said inert gas until the activity of the catalyst has increased, and then resuming hydrogenation.

12. The process of claim 11 wherein the quinone is a 2-alkyl anthraquinone.

13. In the method of producing hydrogen peroxide by alternate catalytic hydrogenation of a member of the group consisting of quinones and azobenzenes in liquid phase and in the presence of metallic hydrogenation catalyst, oxidation of the resulting hydrogenated product to liberate hydrogen peroxide and recovering the hydrogen peroxide, the improvement which comprises continuing said hydrogenation until activity of the catalyst decreases, adding further catalyst to the liquid phase undergoing hydrogenation to compensate for decreased catalyst and thereafter periodically reducing the pressure of hydrogen in contact with said liquid phase and passing an inert gas through said liquid while the catalyst is in contact therewith and while the hydrogen pressure is reduced, continuing said passage of inert gas until the activity of the catalyst has increased and thereafter increasing the hydrogen pressure in contact with said liquid phase, and removing a portion of the catalyst from said liquid phase to compensate for the increased activity of the catalyst.

14. The process of claim 13 wherein the catalyst is metallic palladium.

References Cited in the file of this patent

UNITED STATES PATENTS

| | | |
|---|---|---|
| 2,673,140 | Sprauer | Mar. 23, 1954 |
| 2,739,042 | Corey et al. | Mar. 20, 1956 |
| 2,794,056 | Winstrom et al. | May 28, 1957 |
| 2,901,490 | Sprauer | Aug. 25, 1959 |

OTHER REFERENCES

Berkman et al.: "Catalysis," published by the Reinhold Publ. Corp., N.Y., 1940, page 295.

UNITED STATES PATENT OFFICE
CERTIFICATE OF CORRECTION

Patent No. 3,004,831                          October 17, 1961

Fulton H. Hungerford et al.

It is hereby certified that error appears in the above numbered patent requiring correction and that the said Letters Patent should read as corrected below.

Column 1, line 68, for "containg" read -- containing --; column 2, line 4, for "aklyl" read -- alkyl --; lines 16 and 17, for "substantailly" read -- substantially --; same line 17, for "atmophere" read -- atmospheres --; column 4, line 62, for "holologues" read -- homologues --; column 6, line 66, after "catalyst" insert -- activity --; column 8, line 2, for "Winstrom et al." read -- Winstrom --.

Signed and sealed this 20th day of November 1962.

(SEAL)
Attest:

ERNEST W. SWIDER                          DAVID L. LADD
Attesting Officer                           Commissioner of Patents